Patented Dec. 5, 1944

2,364,503

UNITED STATES PATENT OFFICE 2,364,503

BEARING AND METHOD OF MAKING SAME

George A. Zink, Indianapolis, Ind., assignor to General Motors Corporation, Detroit, Mich., a corporation of Delaware No Drawing. Application May 17, 1939,
Serial No. 274,219

3 Claims. (Cl. 204—26)

This invention has to do with plain bearings such as the radial and thrust bearings employed in internal combustion engines and the like.

The improved bearing possesses good frictional properties and is capable of carrying heavy loads for long periods of time while operating at comparatively high temperatures. It also possesses good resistance to corrosion.

The bearing preferably comprises a back of steel or bronze which serves to increase its load bearing strength. To the back there is secured a lining of lead alloy consisting predominantly of lead with a small addition of tin to give resistance to corrosion and with a slight addition of calcium to increase the hardness of the alloy and consequently its load bearing strength.

The method of manufacture is marked by various novel features hereinafter pointed out having to do with the treatment of the back to prepare it to receive and form a good bond with the soft bearing metal; with the preparation of the soft bearing metal alloy; and with securing the lining to the back. In this method the temperatures employed at different stages in manufacture are of some importance as hereinafter set forth.

I prefer to employ for the back a steel or bronze cylinder, preferably a portion of a seamless or welded tube. However, if preferred, it would be feasible to form the bearing from sheet metal. In some cases cast bronze cylinders may be used. One method of doing this which is especially applicable is described and claimed in Patent No. 1,783,438, granted to Charles H. Landers on December 2, 1930. This method consists in forming the sheet metal into half bearings, assembling a pair of half bearings to form a cylinder and carrying out the remainder of the process with the cylinder so formed. It will be assumed in the following discussion that a cylindrical shell is employed for the bearing back.

The shell is first bored interiorly or, if desired, both interiorly and exteriorly and the ends are faced off. Next the shells are given a protective coating of a metal such as tin which assists in forming a bond between the lining metal and the back. This may be done by plating the cylinder in a sodium stannate bath. A current density of from 30 to 40 amperes per square foot may be employed with a temperature of from 140° to 170° F., the plating requiring about thirty minutes. In the installation now in use a voltage of from 6 to 10 volts has proven adequate to provide the required current density. If desired higher current densities or bath temperatures may be employed and the time of plating may be correspondingly reduced.

Next the bodies are heated in a bath of molten tin at from 650° to 700° F. This heat treatment has the effect of securing a better welding of the tin to the back. The bodies are then removed from the bath and are cleaned with ammonium chloride on the bearing surfaces and preferably also on the faced ends. The bearing shells are then placed back in the tin bath. This fluxing or cleaning with ammonium chloride together with subsequent tinning insures a well bonded tin coating on all the bearing surfaces.

I employ for the bearing lining metal a special alloy of lead which is resistant to corrosion and is also sufficiently hard to carry heavy loads. To secure resistance to corrosion there is added to lead from 4 to 6% tin. To obtain the desired hardness there is added to the lead-tin alloy sufficient calcium to insure a content of from .1 to 1% calcium in the final product.

The above percentages have given the best results in service. However, I have also produced satisfactory bearings using as much as 10% tin.

The soft bearing metal is prepared by melting the lead and tin preferably in the proportions of 95 parts of lead and 5 parts of tin in a suitable pot preferably provided with a protecting gaseous atmosphere. Ordinary illuminating gas will serve this purpose. The molten metal is preferably maintained at a temperature around 1350° F. Metallic calcium is then added by introducing it beneath the surface of the melt. This may be conveniently done by placing it in a perforated box or basket and plunging the box or basket beneath the surface of the molten metal. To insure against depletion of calcium by volatilization or oxidation it may be found necessary to add calcium two or three times during pouring of the charge. The addition of calcium to the melt raises its temperature. In the case of 800 pound heats the temperature is raised to approximately 1400° F.

Following the addition of the calcium the metal is stirred and a sample is analyzed to insure that the proper composition is obtained.

The next step consists in removing one of the shells from the molten tin bath and centrifugally casting the soft bearing metal in it. This may be done in any of the centrifugal casting machines well-known in the art. In casting a suitable amount of the molten alloy is introduced into the shell and the latter is rotated rapidly to distribute the metal uniformly throughout the interior of the shell. During rotation a blast of air preferably containing a small amount of moisture is directed on the exterior of the bearing to assist in chilling the lining metal. It has not been found necessary to employ a protecting atmosphere during casting although this somewhat improves the appearance of the metal. The bearing is preferably left in the centrifugal casting machine until the soft bearing metal has solidified and its temperature has fallen to around 200 to 250° F. to facilitate handling.

The rough bearing is now ready for the usual machining operations to reduce it to the desired dimensions.

Bearings manufactured as above described have given very satisfactory service under severe operating conditions where the loads are heavy and the temperatures relatively high as in Diesel engines employed on passenger trains. The special soft bearing metal possesses the desired good frictional properties and successfully resists the corrosive effects of the acids contained in certain lubricating oils as well as the diluents reaching the crankcase from the combustion chamber by leakage past the pistons. The bearing metal is also sufficiently hard so as to successfully carry heavy loads.

The new bearing alloy will also be found useful for journal bearings such as those commonly used on railway rolling stock. For such uses a greater thickness of bearing metal may be found desirable in accordance with usual railway practice. Such bearings offer greater resistance to deformation than conventional materials, resist cracking and give longer life.

I claim:

1. The method of making a lined bearing which consists in tin plating a cylindrical shell, heating the plated shell in a bath of molten tin maintained at temperatures of from 650 to 700° F. to cause the tin to fuse to the shell, removing the shell from the bath and spinning it while introducing into it a molten alloy consisting of from .1 to 1% calcium, from 4 to 10% tin and the balance lead, said spinning being continued until the alloy solidifies in the shell.

2. The method of making a lined bearing which consists in tin-plating a cylindrical shell, heating the plated shell in a bath of molten tin maintained at a temperature of from 650 to 700° F. to cause the tin to fuse to the shell, removing the shell from the bath and spinning it while introducing into it a molten alloy consisting of from .1 to 1% calcium, from 4 to 10% tin and the balance lead, said alloy being at an initial temperature on the order of 1400° F., continuing the spinning while chilling the exterior of the shell until the alloy solidifies in the shell and the temperature is reduced to on the order of from 200 to 250° F.

3. The method of making a lined bearing which consists in electro-plating a cylindrical steel shell in a sodium stannate solution at a current density of from 30 to 40 amperes per square foot and a temperature of from 140 to 170° F.; heating the plated shell in a bath of tin maintained at a temperature of from 650 to 700° F.; removing the shell from the bath and cleaning the bearing surfaces with ammonium chloride, replacing the shell in the tin bath; again removing the shell from the bath and centrifugally casting into it a soft bearing metal alloy consisting of from .1 to 1% calcium, from 4 to 10% tin and the balance lead, while chilling the exterior of the shell, and thereafter permitting the bearing to cool down to a temperature of from 200 to 250° F. and removing it from the machine.

GEORGE A. ZINK.